June 30, 1936. W. H. HUNTLEY ET AL  2,045,778
MACHINE FOR REMOVING TREAD FROM TIRE CASINGS
Filed May 29, 1935  2 Sheets-Sheet 1
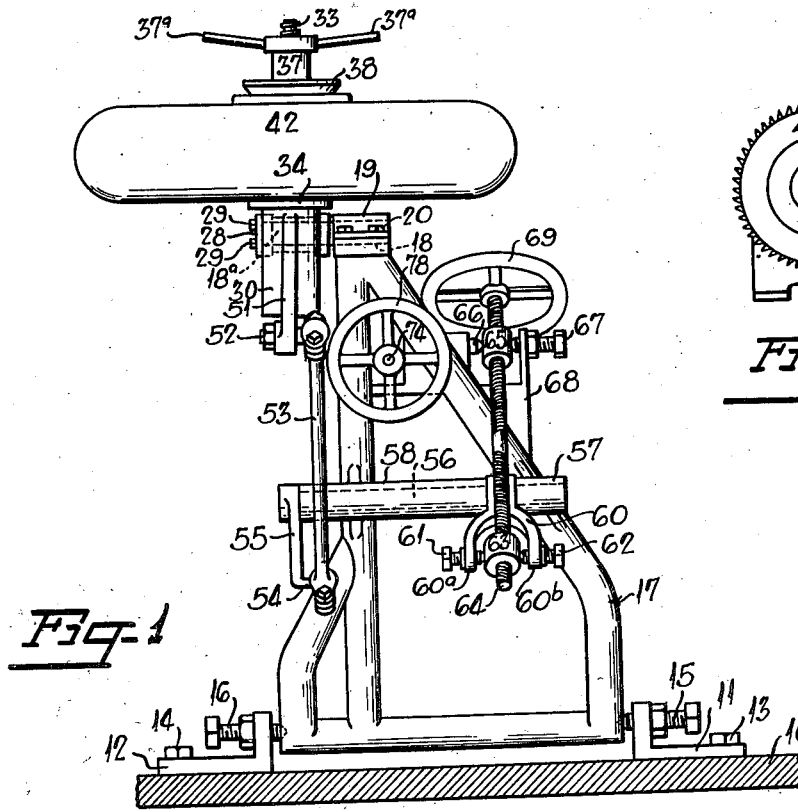
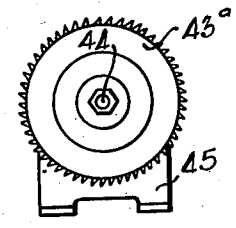
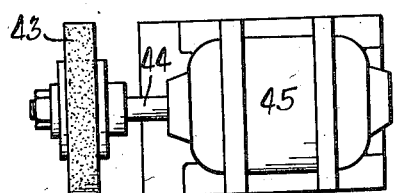
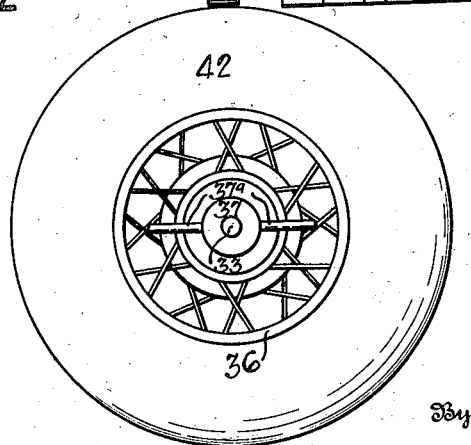
WADE H. HUNTLEY
AND
LEVY B. MEDLIN
Inventors

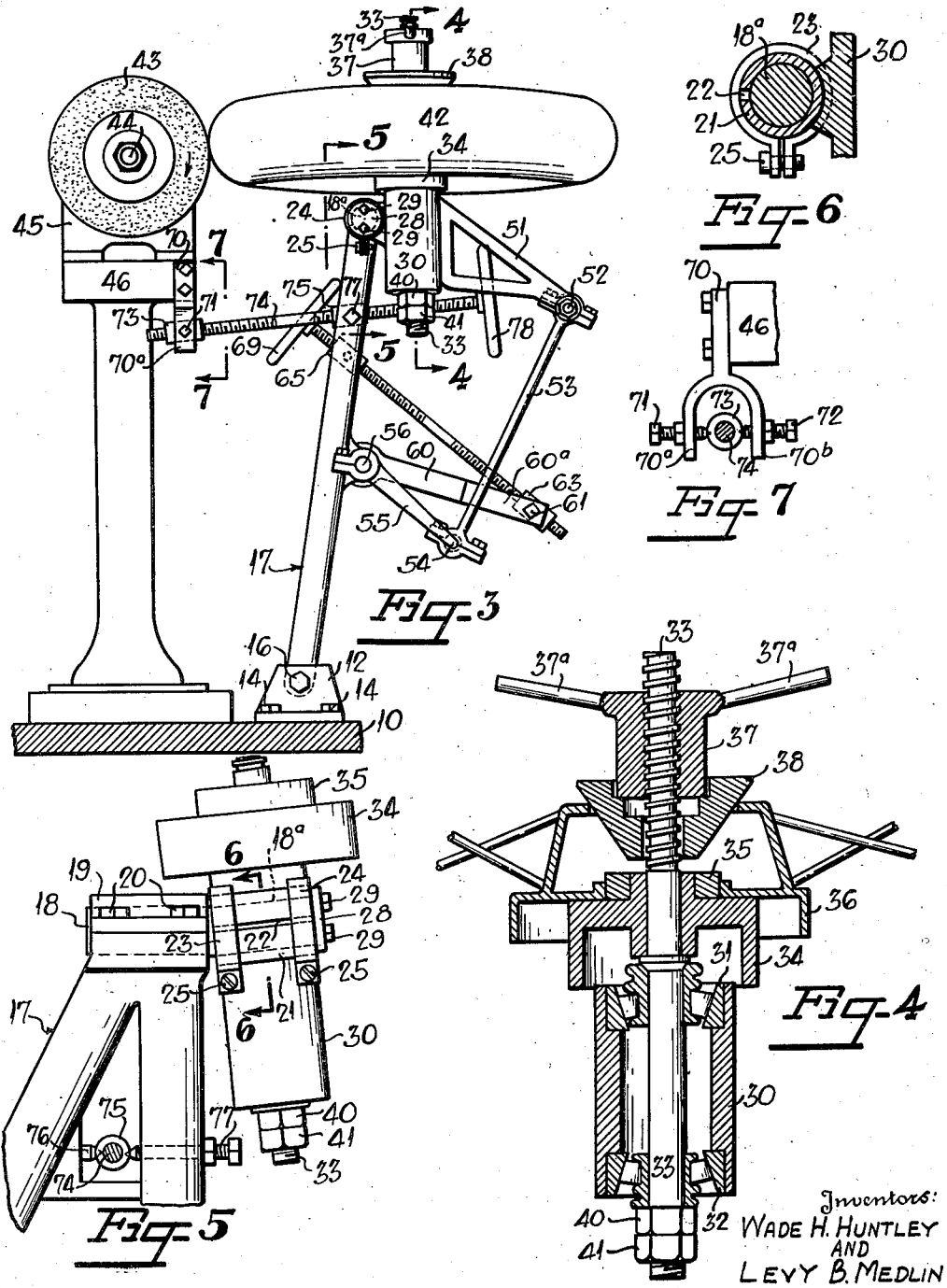

Patented June 30, 1936

2,045,778

UNITED STATES PATENT OFFICE 2,045,778

MACHINE FOR REMOVING TREAD FROM TIRE CASINGS

Wade H. Huntley and Levy B. Medlin, Monroe, N. C.

Application May 29, 1935, Serial No. 24,160

4 Claims. (Cl. 51—97)

This invention relates to an apparatus for removing the worn tread from a used automobile tire in order that a new tread may be placed thereon.

More especially, the invention consists of a grinding or cutting tool and a framework for mounting an inflated automobile tire casing thereon with means for adjusting the angularity of the exterior surface of the tire with relation to the grinding tool.

It is therefore, an object of this invention to provide an apparatus for adjustably mounting an automobile tire with relation to a grinding or cutting tool so that all portions of the tread of the tire are accessible to the grinding tool and also having means for so adjusting said tire that the same will be caused to rotate under the force of the cutting tool, thereby feeding the unfinished portions of the tire to the tool.

Some of the objects of the invention having been stated, other objects will appear as the description proceeds, when taken in connection with the accompanying drawings, in which:—

Figure 1 is a front elevation of the apparatus showing the floor in section;

Figure 2 is a top plan view of Figure 1 showing the upper portion thereof;

Figure 3 is an elevation, showing the floor in section, looking at the left-hand portion of Figure 1;

Figure 4 is a vertical sectional view taken along line 4—4 in Figure 3, showing means for mounting a rim on this apparatus;

Figure 5 is a vertical sectional view taken along line 5—5 in Figure 3;

Figure 6 is a sectional detail view taken along line 6—6 in Figure 5;

Figure 7 is a sectional detail view taken along line 7—7 in Figure 3;

Figure 8 is a view showing a slightly different cutting tool mounted on the motor shaft.

Referring more specifically to the drawings, the numeral 10 denotes a suitable floor or support to which is secured angle members 11 and 12 by any suitable means such as bolts 13 and 14 respectively. Threadably mounted in the upstanding leg of angle members 11 and 12 are pivot bolts 15 and 16 which pivotally engage the opposed sides of frame 17. The upper end of frame 17 has mounted therein a bent shaft 18 and is confined in the upper end of frame 17 by means of a bearing cap 19 and stud bolts 20. By tightening the stud bolts 20 the bearing cap will be caused to frictionally engage the horizontal portion of shaft 18 and cause it to be held in its proper position.

By referring to Figure 5, it is seen that shaft 18 has a portion 18a which is bent upwardly and has mounted therearound a ring or collar 21, said ring being split as at 22 in order that the bands 23 and 24, which are disposed around the ring, may be caused to grip this split ring and cause it to engage the portion 18a. Each of said bands 23 and 24 are adjustably held around the ring 21 by means of a screw 25 which may be tightened or loosened, depending upon the amount of gripping power desired to be applied to the ring 21 and the portion 18a of shaft 18. The portion 18a has a washer secured on the end thereof by any suitable means such as stud bolts 29. When it is desired to turn shaft 18 in order to adjust the angularity thereof, a suitable lever or bar is placed between the studs 29 and rotative movement is imparted to this shaft. This movement, of course is made possible since the bolts 20 are tightened a sufficient amount to allow the shaft 18 to turn in its bearing beneath cap 19.

The split ring 21 has integral therewith a cylinder 30 in which is mounted bearings 31 and 32 which rotatably support spindle 33. The upper end of spindle 33 has fixedly mounted thereon, by any suitable means such as by a pressed fit, a hub 34 and an adapter ring 35 which provides a seat for the hub of a conventional automobile rim and wheel 36. It is seen that the upper end of rod 33 is threaded for reception of a nut 37 having wings 37a integral therewith for turning the same. This nut confines a conical washer 38 on the upper side of the wheel 36 and holds the wheel in fixed position on the upper side of hub 34. The lower end of the spindle 33 has threadably mounted thereon nuts 40 and 41 for holding the shaft in its position within the cylinder 30.

The purpose of bent shaft 18 is to provide means for adjusting the tire at an acute angle with respect to a horizontal plane, that is, so that the axis of rotation of the tire will form an acute angle with the axis of rotation of the grinding tool.

By referring to Figure 1 it is seen that the right-hand end of tire 42 is slightly lower than the left-hand end due to the fact that the portion 18a of shaft 18 is disposed upwardly. When it is desired that the angularity be reversed, and the left-hand side of the tire be at a lower level than the right-hand side a lever is placed between the studs 29 and rotative movement is imparted to shaft 18. When the portion 18a is disposed at approximately 180 degrees from the position shown in Figures 1 and 5, the end of shaft 18a will be at a lower position than the horizontal portion 18, therefore, tire 42 will be tilted in exactly the opposite direction. The reason for tilting the tire in this manner will be presently described.

Mounted on the rim 36 is a conventional automobile casing 42 which is inflated so that its outer tread or surface may be contacted by a suitable grinding tool 43 or 43a which is fixedly mounted on the end of motor shaft 44 of motor 45. The cutting tool 43 may be of any suitable structure, such as, carborundum or emery, or it may be a rasp tool, having pointed projections on its periphery for cutting the rubber tread from the tire.

The motor 45 is supported by a suitable stand 46 which projects downwardly and rests upon the floor 10. When the tire 42 is disposed in the position shown in Figures 1 and 3, or in other words, in a position where the right-hand side of a tire as shown in Figure 1, will be tilted so that this side will be lower than the left-hand side of the tire, the rotation of the grinding tool 43, which removes the excess tread from the surface thereof, will cause the tire 42 to rotate in a clockwise manner, in Figure 2.

The reason for this is obvious, since when the tire is tilted, there will be a horizontal component of the downward force exerted by the grinding wheel 43 on the tire 42. Since the tire is tilted with the right side downwardly (Fig. 1), this component will necessarily be to the right, thereby causing the tire to rotate as the same is being ground. This rotative motion is imparted to the grinding wheel itself as the tread is being removed. Should it be desired to cause the rotation to be in the opposite direction, then the tire will be tilted in an opposite manner, that is, with the left-hand side (Fig. 1), at a lower elevation than the right-hand side. By providing a device of this type, it is not necessary to rig up mechanical means for rotating the tire. When it is desired to vary the speed of rotation, the angularity or tilt is increased or decreased to suit the particular job in question.

The cylinder 30 has a bracket 51 secured thereto, said bracket extending outwardly and downwardly and having a ball mounted as at 52 in the end thereof. Rod 53 has a socket on each end thereof and is connected as at 52 to the bracket 51 and as at 54 to a ball on lever 55. The lever 55 is fixedly secured on the end of a shaft 56 which is mounted for oscillation in bearings 57 and 58 secured to framework 17.

Shaft 56 also has fixedly mounted thereon an arm 60 which is forked at its free end forming members 60a and 60b, said members having threadably mounted therein pivot bolts 61 and 62, which engage a block 63. The block 63 has threadably mounted therein a rod 64 which extends upwardly and is also threadably mounted in another block 65 disposed between pivot 66 and pivot bolt 67, said pivot and pivot bolt being secured in a bracket 68 mounted on the side of framework 17. The upper end of rod 64 has a suitable hand wheel 69 secured thereon for turning rod 64 and adjusting the tire 42 with relation to the grinding tool 43. It should be noted that the rod 64 has opposed sets of threads thereon in order that the turning of the rod may rotate the shaft 56 faster, thereby causing the tire 42 to be adjusted more quickly.

It is seen by referring to Figure 3 that the adjustment merely causes the tire 42 to rotate about the shaft 18 and will enable one to place the tire in a position so that the grinding tool 43 will contact any portion of the periphery thereof.

In order to adjust the tire so that its proximity to the grinding wheel 43 may be effected, a suitable bracket 70 is secured to support 46 and has forked portions 70a and 70b in which are threadably mounted pivot bolts 71 and 72 respectively. These bolts are adapted to engage block 73 in which is threadably mounted a rod 74, said rod also being threadably mounted in a similar block 75 disposed between pivot 76 and pivot bolt 77. The other end of rod 74 has fixedly secured thereon a hand wheel 78 which, when rotated, will cause the framework 17, with the tire thereon, to rotate about pivot points 15 and 16 thereby affording means for adjusting the tire with relation to the grinding wheel 43. The rod 74 also has opposed sets of threads thereon which will cause the framework 17 to be rotated faster when the rod 74 is turned, than it would be if only one set of threads were placed thereon.

It is, therefore, seen that means have been provided for adjusting the angularity of the axis of rotation of the tire so that any portion of the periphery thereof may be contacted by a grinding tool whose axis of rotation is fixed.

In Figure 8 a slightly different form of cutting tool 43a is mounted on motor shaft 44. This tool may be used when a faster cutting speed is desired.

In the drawings and specification there has been set forth a preferred embodiment of the invention, and although specific terms are employed, that are used in a generic and descriptive sense only, and not for purposes of limitation, the scope of the invention being set forth in the appended claims.

We claim:
1. Apparatus for cutting the tread portion from the periphery of a tire casing comprising a rotary cutting tool, a pivoted frame, means for supporting a tire casing for rotation, a bent shaft having one leg thereof supporting said tire supporting means, the other leg of said shaft being mounted in the free end of said frame, means for adjusting the frame to position the tire casing with relation to the cutting tool to determine the portion of the tread engaged by the cutting tool, means for adjusting said shaft to position the tire casing with relation to the plane of rotation of the cutting tool and means for adjusting the casing supporting means on said bent shaft whereby the rotation of the cutting tool will impart rotation to the tire casing to feed the uncut portions of the tread successively to the cutting tool.

2. Apparatus for cutting the tread from a tire comprising a cutting tool mounted for rotation on a fixed horizontal axis, a pivoted frame having its horizontal axis of rotation parallel to the axis of rotation of said cutting tool, means for adjusting the free end of the frame with relation to the cutting tool, a bent shaft adjustably mounted on the free end of said frame, a tire support rotatably and adjustably mounted on the bent shaft, the bent shaft permitting adjustment of the angle at which the cutting tool strikes the tire so as to regulate the rotary movement imparted to the tire by the cutting tool as the cutting tool cuts the tread from the tire.

3. In a machine for cutting the tread from automobile tire casings, a rotary cutting tool, a framework, means for adjusting the position of said framework with relation to said tool, a bent shaft having one leg thereof adjustably secured in the framework, a spindle for supporting the tire casing for rotation, means for adjustably mounting said spindle on the other leg of said bent shaft for rotation thereon.

4. Apparatus for removing the tread from a tire casing comprising a rotary cutting tool, a frame movable towards and from said tool, a bent shaft having two legs, means for adjustably securing one of the legs of said shaft in said frame, a support for the tire casing mounted for adjustment on the other leg of said shaft, and means for moving the frame to hold the casing in contact with said tool.

WADE H. HUNTLEY.
LEVY B. MEDLIN.